United States Patent
Majumdar et al.

(10) Patent No.: US 7,419,557 B2
(45) Date of Patent: Sep. 2, 2008

(54) METHOD FOR PROTECTING TIRE INNERLINER USING THERMOFORMABLE FILM COATED WITH PRESSURE-SENSITIVE ADHESIVE

(75) Inventors: Ramendra N. Majumdar, Hudson, OH (US); Ronald F. Page, Burlington, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 343 days.

(21) Appl. No.: 11/221,461

(22) Filed: Sep. 8, 2005

(65) Prior Publication Data
US 2007/0051453 A1 Mar. 8, 2007

(51) Int. Cl.
*B29D 30/06* (2006.01)
(52) U.S. Cl. .......... 156/123; 152/152.1; 152/154.1; 152/510; 156/110.1; 156/247
(58) Field of Classification Search .......... 156/110.1, 156/123, 75, 247, 116, 289; 152/152.1, 154.1, 152/510
See application file for complete search history.

(56) References Cited

U.S. PATENT DOCUMENTS

| | | | | |
|---|---|---|---|---|
| 2,973,286 | A * | 2/1961 | Ulrich | 428/355 AC |
| 3,285,314 | A | 11/1966 | Roberts | 152/524 |
| 4,443,279 | A | 4/1984 | Sandstrom | 156/123 |
| 4,581,281 | A | 4/1986 | Gerace | 428/215 |
| 4,744,851 | A | 5/1988 | Lorenz | 156/289 |
| 4,816,095 | A | 3/1989 | Taylor | 156/96 |
| 5,641,318 | A | 6/1997 | Vetter | 493/189 |
| 6,217,683 | B1 | 4/2001 | Balzer et al. | 156/60 |
| 6,238,760 | B1 * | 5/2001 | Majumdar et al. | 428/40.1 |
| 6,244,104 | B1 | 6/2001 | Koch et al. | 73/146 |
| 6,495,229 | B1 | 12/2002 | Carte et al. | 428/40.1 |
| 6,524,415 | B1 | 2/2003 | Youngman et al. | 156/123 |
| 6,824,871 | B2 | 11/2004 | Chu | 428/395 |
| 6,848,487 | B2 | 2/2005 | Weydert et al. | 152/525 |
| 2003/0211273 | A1 | 11/2003 | Perry et al. | 428/41.5 |
| 2004/0095244 | A1 * | 5/2004 | Conwell et al. | 340/572.8 |
| 2004/0103967 | A1 | 6/2004 | Majumdar et al. | 152/450 |

FOREIGN PATENT DOCUMENTS

JP 2002-012002 A 1/2002

* cited by examiner

*Primary Examiner*—Geoffrey L Knable
(74) *Attorney, Agent, or Firm*—Wood, Herron & Evans, L.L.P.

(57) ABSTRACT

A method is provided for protecting a virgin surface of a tire innerliner from contamination by a release agent during curing. A pressure-sensitive adhesive (PSA)-coated thermoformable film is pressed onto an exposed virgin surface of a green tire innerliner to adhere the PSA to the virgin surface and thereby form a protected green innerliner. The PSA is based on a rubber that is compatible with the rubber of the tire innerliner. The protected green innerliner is then exposed to the release agent, and cured. By virtue of the PSA, the film stays reliably in position. The thermoformable film is then removed to reveal the cured virgin surface substantially free of the release agent.

19 Claims, 2 Drawing Sheets

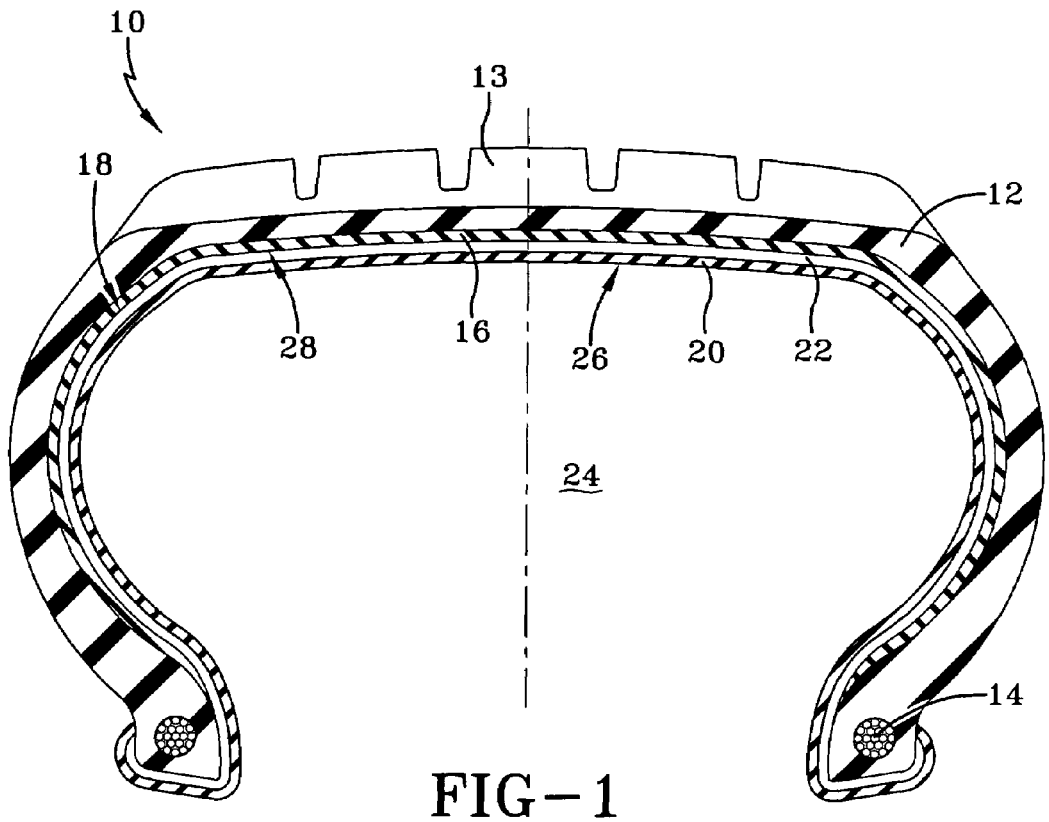
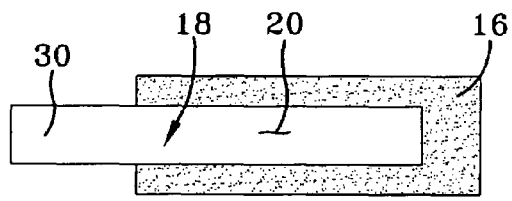
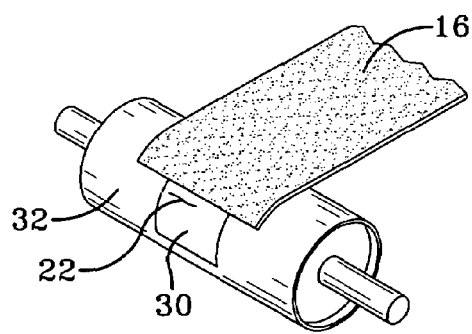
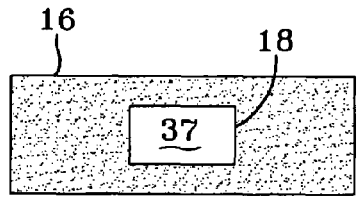
FIG-1
FIG-2
FIG-3
FIG-4

METHOD FOR PROTECTING TIRE INNERLINER USING THERMOFORMABLE FILM COATED WITH PRESSURE-SENSITIVE ADHESIVE

FIELD OF THE INVENTION

This invention relates to a method of protecting the innerliner of a tire from contamination during manufacture to enable subsequent adhesion of a component to the innerliner surface.

DEFINITIONS

"Carcass" means the tire structure apart from the belt structure, tread, undertread, and sidewall rubber over the plies, but including the beads.

"Innerliner" means the layer or layers of elastomer or other material that form the inside surface of a tire and that contain the inflating fluid within the tire. The "innerliner" of a tube-type tire is often called a "squeege" to distinguish it from the innerliner of a tubeless tire.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load.

"Tread" means a molded rubber component which, when bonded to a tire casing, includes that portion of the tire that comes into contact with the road when the tire is normally inflated and under normal load, i.e., the footprint.

The terms "cure" and "vulcanize" are intended to be interchangeable terms unless otherwise noted.

The terms "green" and "uncured" are intended to be interchangeable unless otherwise noted.

"Virgin surface" means a surface, whether cured or not, that has not been subjected to a cleaning process and that has not come in contact with a release agent.

BACKGROUND OF THE INVENTION

Carcasses of pneumatic green tires are built as a series of layers of flexible high modulus cords encased in a low modulus rubber. An innerliner is positioned to form the innermost surface of the tire. The green tire is cured in a curing press using a curing bladder, which forces expansion of the tire. During curing, the innerliner expands with the carcass, which is forced against the indentations in the curing mold to form the tread of the tire, and all components are co-cured so as to provide a substantially cohesive bond between one and another.

The innerliner for a pneumatic tubeless tire is typically formed from a compound containing a high proportion by weight of a halobutyl rubber due to its good barrier properties. Before the tire is cured, the entire inner surface of the innerliner and/or the outer surface of the curing bladder are coated with a release agent. The release agent is commonly referred to as a "lining cement" when used on the surface of the innerliner, and as a "bladder lube" or "bladder spray" when used on the curing bladder. The release agent facilitates removal of the curing bladder from the innerliner after curing so that the innerliner is not damaged. The innerliner (or squeege) for a pneumatic tube-type tire is typically a thin layer of ply coat stock to protect the tube from direct contact with nylon. These innerliners normally do not contain halobutyl rubber since barrier properties are not required.

Tires are often required to have a rubbery component bonded to a portion of the tire's innermost surface, i.e., the innerliner. For example, some tires are dynamically balanced by adhering a laminar pad of rubbery material, referred to as a "balance pad", symmetrically about the circumferential center line of the interior surface of the cured tire. In another example, smart tires include an electronic monitoring device secured to the innermost surface of the tire. The electronic monitoring device is used to record the operating history of a tire, including temperature and pressure, distance traveled, impact sustained, and other data, to transmit the data to the driver or to a designated receiving station, and to do so without taking the tire out of service. A requirement of these components is that they be securely mounted within the tire so as to tolerate any condition to which the tire is subjected without being dislodged. Thus, a strong bond to the innerliner is essential for these components.

Prior to bonding a component, such as a balance pad or electronic monitoring device, to the cured innerliner, the innerliner must be cleaned to remove contaminants present on the innerliner surface from the molding operation. In particular, the release agent must be removed from the innerliner surface. Solvents have typically been used for this cleaning operation. Solvents effective for removing the release agents contain hazardous air pollutants. These solvents are thus subject to environmental regulations, which have become more stringent in the recent past. It would thus be desirable to eliminate the need for solvent cleaning of the innerliner surface in order to comply with strict environmental regulations. In addition, solvent cleaning is labor intensive and costly due to its hazardous nature, such that significant cost savings may be realized by elimination of the solvent cleaning process.

One solution for eliminating the solvent cleaning process is disclosed in commonly-owned U.S. Patent Application Publication No. 2004/0103967. A barrier film is removably adhered to the innerliner surface to protect that surface from contamination by the release agent. While the protective barrier initially sticks well to the green innerliner, it has a tendency to separate or shift during the high pressure lining cement spray and/or during shaping by the curing bladder, and thus, may not completely prevent contamination of the innerliner surface. For example, the lining cement may spray underneath the splice of overlapped film, causing the film to come off. There is thus a need to improve the reliability of protective barriers for the innerliner surface such that these barriers can effectively replace the solvent cleaning process.

SUMMARY OF THE INVENTION

The present invention provides a method for protecting a virgin surface of a tire innerliner from contamination by a release agent during curing. To that end, a pressure-sensitive adhesive (PSA)-coated thermoformable film is pressed onto an exposed virgin surface of a green tire innerliner to adhere the PSA to the virgin surface and thereby form a protected green innerliner. The PSA is based on a rubber that is compatible with the rubber of the tire innerliner. In an exemplary embodiment, the PSA comprises, as a principle component, natural rubber, a halobutyl rubber, a butyl rubber, or a polybutadiene rubber. In another exemplary embodiment, the thermoformable film is a nylon film. The protected green innerliner is then exposed to the release agent, such as by a high pressure spray, and cured. By virtue of the PSA, the film stays reliably in position when exposed to the release agent and during curing. The thermoformable film may then be removed to reveal the cured virgin surface substantially free of the release agent.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a sectional view showing an embodiment of the present invention.

FIG. 2 is a plan view, not to scale, of an assembly of a strip of PSA-coated thermoformable film long enough to overlie the entire circumferential surface of a rolled sheet of innerliner and to provide a pull-tab.

FIG. 3 is a perspective view schematically illustrating positioning of a prepared innerliner (as shown in FIG. 2) on a tire building drum.

FIG. 4 is a plan view, not to scale, of an assembly of a strip of PSA-coated film covering only a portion of a sheet of innerliner.

DETAILED DESCRIPTION

Figure 5:
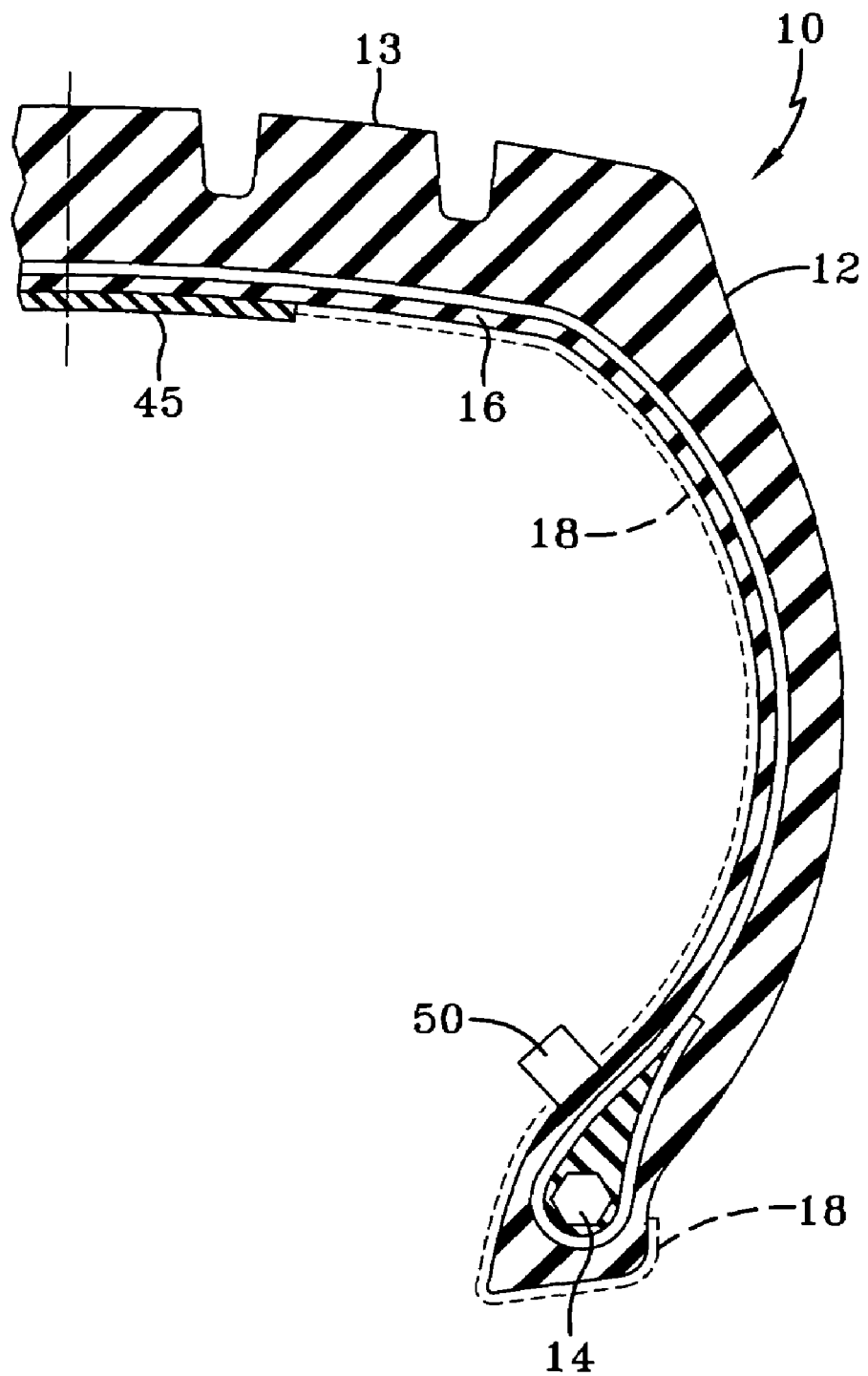
FIG. 5 is a partial cross-section of a tire having a sheet of PSA-coated film in phantom view to show its removal after cure, and a balance pad and electronic monitoring device adhered to the virgin innerliner surface.

In accordance with the present invention, the innerliner of a tire is protected from contamination, primarily that occurring from release agents used during the curing process, by adhering a protective barrier to the green virgin innerliner surface. The protective barrier is a thermoformable film adapted to stretch with the tire materials during the shaping and curing process. The thermoformable film is coated with a pressure-sensitive adhesive (PSA) that is pressed to the green virgin innerliner surface to reliably and releasably adhere the thermoformable film. The PSA is particularly effective in preventing movement of the thermoformable film during high-pressure spraying of lining cement to the innerliner. The invention may be further understood by reference to the Figures.

Like reference numerals are used throughout the several Figures to refer to like components, and like reference numerals are used to refer to components in both the cured and uncured (green) states. FIG. 1 depicts in cross-section a tire assembly 10 in accordance with the present invention. Tire assembly 10 includes a carcass 12 having a tread 13 disposed on the outermost surface, where tread 13 is the portion of the tire assembly 10 that contacts the ground during operation of the tire. As is known in the art, the carcass 12 may include one or more plies of cords and the carcass wraps the bead portions 14 of the tire 10. An innerliner 16 is disposed inside the carcass 12 so as to face the air chamber 24. In accordance with the present invention, the innerliner 16 is protected with a PSA-coated film 18, which includes a PSA 22 adhered to the green virgin surface 28 of innerliner 16 and a thermoformable film 20 at the innermost surface 26 facing the air chamber 24.

To form the tire assembly 10, the method of the present invention includes assembling the innerliner 16 in a green state, i.e., an uncured state, adjacent the green tire carcass 12, and adhering the PSA-coated film 18 to the green virgin surface 28 of green innerliner 16. A green tread strip 13 is assembled adjacent the outermost surface of the tire carcass 12. These layers may be assembled in any desired order. This green tire assembly 10 is then placed into a curing mold (not shown) such that the green tread strip 13 is positioned against the mold surface (not shown), and the film 20 of the PSA-coated film 18 is furthest from the mold surface so as to form the innermost layer.

Typically, before all components are in place within the mold, a release agent (not shown) is applied to the green innerliner 16 over the PSA-coated film 18 such that the film 20 acts as a protective barrier to prevent contact by the release agent to the virgin surface 28. The release agent, which is also referred to as lining cement, is generally applied by a high-pressure spray. Examples of lining cement-type release agent include organopolysiloxane- or silicone-based materials, such as polydimethylsiloxane with powdered mica or crystalline silica. Examples of commercially available lining cements are crystalline silica inside tire lube sold by Kalcor Coating Co. under Product Number 284-TCW, and LYND-COAT® DV silicone-containing release agent from Rhodia Silicones. By virtue of the PSA 22, the high-pressure lining cement spray does not displace the thermoformable film 20.

After the green assembly 10 with protected innerliner 16 is placed in the mold, an expandable curing bladder (not shown) is then expanded against the protected innerliner 16 to press the green tire assembly 10 into the mold surface to press the green tread strip 13 into a tread pattern formed in the mold surface. A vulcanization temperature is applied in the mold while the tire assembly 10 is subjected to the pressure from the expanded curing bladder for a time sufficient to cure the tire assembly 10. After curing is completed, the curing bladder is deflated and stripped from the innerliner 16 protected by the PSA-coated film 18. Any loose lining cement may then be vacuumed from the inside of the tire assembly 10, and the thermoformable film 20 is removed to reveal a cured virgin surface 28 free of release agent.

One embodiment of a method of the present invention may be described with further reference to FIGS. 2-3. As illustrated in FIG. 2, prior to the innerliner 16 being positioned on a building drum 32, a strip of PSA-coated film 18, for example having a width less than the width of the innerliner, is positioned symmetrically about the longitudinal central axis of the green innerliner 16 with PSA 22 pressed to the green virgin surface 28 of the green innerliner 16 causing the film 20 to be reliably and removably adhered to the green innerliner 16. Preferably there is an overhand or "overlap" 30, sufficient to afford a pull-tab, to facilitate easy removal of the thermoformable film 20 after cure. Alternatively, the PSA-coated film 18 may have a width equal to or greater than the width of the green innerliner 16 in the tire assembly 10, as depicted in FIG. 1, so that no portion of the surface 28 of the innerliner 16 is unprotected.

As shown in FIG. 3, from about 2 cm to 20 cm of one end of the PSA-coated film 18 extends beyond one end of the green innerliner 16 as it is positioned on the drum 32, to form the overlap 30. To facilitate visual detection through the lining cement, the overlap 30 may be colored so as to contrast with the black of the innerliner 16 or white lining cement.

The green tire assembly 10 is removed from the drum 32 and can be stored with the PSA-coated film 18 protecting the green virgin surface 28 of the green innerliner 16. The innermost surface 26 is then sprayed with lining cement, which completely or partially covers the film 20, and the green assembly 10 is placed in a curing press to be conventionally cured. The cured tire assembly 10 is removed from the press, and the inside of the tire is vacuumed to remove lining cement, which is generally loosely attached to the film 20. The thermoformable film 20 is then manually removed in one piece by pulling on the protruding end 30 of PSA-coated film 18. The cured virgin surface 28 beneath the PSA-coated film 18 is exposed, and is free of lining cement.

In another embodiment of the method of the present invention, a strip of PSA-coated film 18, for example, having a width substantially corresponding to the width of the tread 13, is inserted into the green assembly 10 after the assembly 10 is removed from the drum 32, and is positioned symmetrically about the circumferential center line of the green innerliner 16, pressing the PSA 22 of the PSA-coated film 18 against the green innerliner 16, so that it is adherently secured to the green innerliner 16, preferably leaving an overhang 30, as before. The innermost surface 26 of the green assembly 10 with the PSA-coated film 18 in position is then spray-coated with lining cement and the tire assembly 10 cured as before. When the thermoformable film 20 is removed, a cured virgin surface 28 is exposed that is substantially indistinguishable from the cured virgin surface 28 produced by the prior method of building the tire 10 with the PSA-coated film 18 pre-positioned on the innerliner 16, but the prior method may be less cumbersome and less time-consuming.

Another embodiment of the present invention is illustrated in FIG. 4. In the event that only a portion of the innerliner 16 is to be protected, as for example, when a patch 37 of virgin surface is sufficient for the purpose at hand, a sheet of PSA-coated film 18 is superimposed on the chosen patch 37 and pressed onto the green innerliner 16. The green innerliner 16 is then positioned on the building drum (not shown) and construction of the tire assembly 10 is completed in the usual manner. The green tire assembly 10 is then removed from the building drum, sprayed with lining cement and cured. Upon cooling, and after removing loose lining cement, the thermoformable film 20 is readily removed. To facilitate easy removal, it is advisable to keep a small crease on the PSA-coated film 18, which forms a pull-tab after cure (not shown in FIG. 4). It will be evident that, where only a patch of virgin surface is required, the PSA-coated film 18 may be post-positioned, that is, pressed onto the chosen patch 37 of green innerliner 16 after the green tire 10 is constructed in a conventional manner.

Following removal of the thermoformable film 20, a balance pad 45 or electronic monitoring device 50, for example, may be applied to the cured virgin surface 28 of innerliner 16, as depicted in FIG. 5, without the need for a solvent cleaning process. By way of example, a cured tire assembly 10 having a cured virgin surface 28 free of release agent by virtue of using PSA-coated film 18 during curing is mounted on a balancing machine. A "fast dry cement," available from Patch Rubber Co., is applied to the cured virgin surface 28 of innerliner 16 at the desired location, and the balance pad 45 is tightly pressed onto the coated surface and allowed to cure at ambient temperature for about three days. The balance pad 45 is secured tightly so that it will not fall off during operation of the tire. In addition to, or as an alternative to, coating the innerliner 16 with the adhesive, the bonding side of the balance pad 45 may be coated with the adhesive. Where both the innerliner 16 and the balance pad 45 are coated, the same adhesive or different adhesives may be used.

In accordance with the present invention, the PSA-coated thermoformable film separates all or a part of the innerliner surface from the curing bladder surface during the shaping and curing steps to prevent contamination of the virgin surface of the innerliner in the mold. In order to expand with the innerliner during green tire building and curing, the thermoformable film should exhibit the property of necking, which refers to the ability of a material to stretch without returning back to its original shape. The film advantageously exhibits necking in at least one direction, and preferably in both directions, usually referred to as the machine direction (MD) and cross direction (CD). The necking force, in accordance with room temperature testing at a cross-head speed of 20 in./min, is advantageously below about 25 lbf, and more advantageously below about 20 lbf, in at least one direction, and preferably in both directions, for a 1 inch wide strip. Non-oriented films are desirable, though partially oriented films may also be used. Non-oriented films may be characterized by essentially equal necking forces in both the machine and cross directions.

Further, the thermoformable film should exhibit a melting point greater than the curing temperature of the tire assembly, which is generally in the range of about 121° C. (250° F.) to about 200° C. (392° F.). The thermoformable film should further have sufficient strength to be removed from the innerliner in a single piece for ease of manufacture. In an exemplary embodiment, the thermoformable film may be overlapped to form a pull-tab to facilitate easy removal of the film, and the overlapped portion of the film must not fuse together. In one embodiment, the thermoformable film has a thickness less than about 5 mils (127 μm), for example less than about 3 mils (76.2 μm). In another embodiment, the thermoformable film has a thickness greater than about 0.6 mil (15 μm), for example, greater than 0.75 mil (19 μm). Nylon 6 and nylon 6,6 films on the order of 0.75 mil to 2 mils thick may serve as exemplary thermoformable films in the present invention. Exemplary films include: CAPRAN® Nylon, which is a multipurpose nylon 6 film commercially available from Honeywell, International, Pottsville, Pa.; fluorinated ethylenepropylene (FEP) films, such as TEFLON® FEP fluorocarbon film from DuPont Films or A4000 from Airtech International, Inc.; 1-phenyl-3-methyl-5-pryrazolone (PMP) films, such as PMP Release Film from Honeywell; and C917 DARTEK®, which is a nylon 6,6 film available from DuPont, Canada. Necking force, maximum tensile strength, % elongation and thickness for these exemplary films (1 inch wide) are provided below in Table 1. Exemplary thermoformable films are those that are non-oriented or only partially oriented and exhibit a necking force in both the machine direction and cross direction of less than 20 lbf.

TABLE 1

| Sample | Mil | μm | Max Tensile (MPa) | Necking (lbf) | Elongation (%) |
|---|---|---|---|---|---|
| TEFLON ® FEP (MD) | 1 | 25.4 | 22 | 2.25 | 393 |
| TEFLON ® FEP (CD) | 1 | 25.4 | 23.5 | 2.6 | 272 |
| PMP (MD) | 1 | 25.4 | 28 | 3.5 | 107 |
| PMP (CD) | 1 | 25.4 | 28 | 2.5 | 90 |
| C917 DARTEK ®, (MD) | 2.0 | 50.8 | 173 | 11.5 | 202 |
| C917 DARTEK ®, (CD) | 2.0 | 50.8 | 118 | 11.25 | 128 |
| C917 DARTEK ®, (MD) | 0.75 | 19 | 48.9 | 4.5 | 90 |
| C917 DARTEK ®, (CD) | 0.75 | 19 | 47.7 | 4.25 | 59 |
| CAPRAN ® Nylon (MD) | 1 | 25.4 | 61 | 7 | 118 |
| CAPRAN ® Nylon (CD) | 1 | 25.4 | 63 | 6 | 60 |

By way of further example, nylon films are particularly useful in the method of the present invention. Examples of nylons which may be formed into film are linear polycondensates of lactams of 6 to 12 carbon atoms and conventional polycondensates of diamines and dicarboxylic acids, e.g. nylon 6,6; nylon 6,8; nylon 6,9; nylon 6,10; nylon 6,12; nylon 8,8; and nylon 12,12. Further examples to be mentioned are nylon 6, nylon 11 and nylon 12, which are manufactured from the corresponding lactams. In addition, it is possible to use polycondensates of aromatic dicarboxylic acids, e.g., isophthalic acid or terephthalic acid, with diamines, e.g., hexamethylenediamine, or octamethylenediamine, polycarbonates of aliphatic starting materials, e.g., m- and p-xylylenediamines, with adipic acid, suberic acid and sebacic acid, and polycondensates based on alicyclic starting materials, e.g., cyclohexanedicarboxylic acid, cyclohexanediacetic acid, 4,4'-diaminodicyclohexylmethane and 4,4'-diaminodicyclohexylpropane.

The PSA is a rubber-based adhesive that is compatible with the rubber of the innerliner. As is known in the adhesive art, PSA's typically principally comprise a polymer system, one or more tackifiers, and one or more plasticizers. In the present invention, the polymer system for the PSA is rubber-based so as to be compatible with the rubber of the innerliner. Without being bound by theory, during curing of the tire assembly, the PSA is believed to lose its status as a PSA, due to migration of the tackifier and/or other materials and/or degradation of the PSA at high temperature. When the thermoformable film is removed, all or some of the PSA, or former PSA, may be removed with the film and/or some or all may remain on or as part of the innerliner. Again, without being bound by theory, if the PSA composition is based on a rubber that is compatible with the rubber of the innerliner, then during curing, the degrading PSA may, in whole or part, migrate into the innerliner surface, thereby becoming part of the cured virgin innerliner surface. Alternatively, it may leave a cohesively-bonded surface coating, but that coating is itself an innerliner-type rubber and is free of release agent, thus being essentially the same as the cured virgin innerliner surface. Thus, in an exemplary embodiment, the PSA is curable during tire vulcanization to cohesively bond with or become a part of the tire innerliner.

In an exemplary embodiment of the present invention, the PSA may be a natural rubber-based, butyl rubber-based, halobutyl rubber-based or polybutadiene rubber-based adhesive, or combination thereof, since these rubbers are commonly used tire materials. By "rubber-based" is meant that the rubber is the principle component of the PSA, i.e., the component present in the greatest quantity. In a further exemplary embodiment, the PSA is a permanent grade hot-melt PSA. An exemplary PSA is commercially available from H.B. Fuller Company, Vadnais Heights, Minn., as a permanent grade, hot-melt PSA under Product Number HL2201X. Another PSA is Product Number G1110 from 3M (formerly Emtech). The PSA adheres the thermoformable film reliably to the innerliner surface, and yet allows the thermoformable film to be removed therefrom after curing the tire assembly.

The PSA may be coated onto the thermoformable film by any desirable method, such as solvent coating or hot melt extrusion coating. A film could also be purchased pre-coated. The PSA-coated film may be adhered by any pressure suitable for the particular type of adhesive. For example, hand pressure may be used to adhere to the PSA to the innerliner, or a roller, such as a 1 inch roller, may be rolled along the surface of the PSA-coated film to adhere the PSA.

A cured aircraft tire having an innerliner with its entire circumferential inner surface directly underneath the tread free from contamination by any release agent commonly used in the curing of a tire in a curing press, may be prepared as described above and illustrated by the following prophetic Example 1. Unless otherwise indicated, all parts and percentages are by weight.

EXAMPLE 1

A bias PBI 22×6.75-10 (22", 55.9 cm×6.75", 17 cm-10", 25.4 cm) 8 ply rating aircraft pneumatic rubber tire (first tire), with a glossy innerliner compounded from 90% bromobutyl rubber and 10% butyl rubber, is built on a drum. First, a commercially available continuous strip of thin clear unoriented 6,6-nylon film, 9.5 cm (3.75") wide and 19 μm (0.75 mil) to 51 μm (2 mils) thick, which is coated on one side with a PSA, is positioned symmetrically about the longitudinal axis of an innerliner so that from about 2 cm or more of one end of the nylon strip extends beyond one end of the innerliner as shown in FIG. 2, to provide protection for part of the entire circumferential virgin surface of the innerliner. The PSA side of the PSA-coated nylon film is pressed onto the innerliner to secure the film thereto. The assembly is circumferentially positioned around the drum with the nylon strip in direct contact with the drum's surface, and a portion of one end of the nylon sheet overlapping the other, preferably sufficiently to provide for requisite expansion of the tire and a pull-tab, ensuring that the nylon film does not interfere with splicing of the innerliner. The remaining belts of the tire are positioned onto the building drum and the construction of the tire carcass with a ground contacting tread, spaced beads and connecting sidewalls, is completed in the usual manner.

The adherence of balance pads to a virgin surface that had been protected by a thermoformable film, rather than cleaned with a solvent, was investigated, as follows in Example 2.

EXAMPLE 2

Green innerliner samples were prepared from a high halobutyl-based aircraft tire innerliner compound, namely 90% bromobutyl rubber and 10% butyl rubber. A PSA-coated thermoformable film was hand-pressed onto the test samples, with the PSA contacting the innerliner compound. A thermoformable film without a PSA coating was applied to comparative samples. The protected test samples and protected control samples were cured for 38 minutes at 150° C. The films were then removed to reveal a cured virgin surface. The virgin surfaces and one side of aged balance pads were then each coated with "fast-dry cement," and the coated sides of the aged balance pads pressed onto the cement-coated virgin surfaces. The adhesion results of the aged balance pads to the virgin surfaces are as provided in Table 2:

TABLE 2

| Sample | Film/PSA | Comments on pull-tab formation without adhesive layer | Subjective Adhesion | Adhesion* N/inch |
| --- | --- | --- | --- | --- |
| Comparative Sample 1 | 2 Mil DARTEK ® (Nylon 6,6)/No PSA | Easy removal, good pull-tab | V Strong | 77.8 |
| Test Sample 1 | 2 Mil DARTEK ® (Nylon 6,6)/G1110 | Easy removal, good pull-tab | Medium | 58.6 |
| Test Sample 2 | 2 Mil DARTEK ® (Nylon 6,6)/HL2201X | Easy removal, good pull-tab | V Strong | 81.8 |

TABLE 2-continued

| Sample | Film/PSA | Comments on pull-tab formation without adhesive layer | Subjective Adhesion | Adhesion* N/inch |
|---|---|---|---|---|
| Comparative Sample 2 | 1 Mil CAPRAN ® Nylon (Nylon 6)/No PSA | Easy removal, good pull-tab | V Strong | 118.6 |
| Test Sample 3 | 1 Mil CAPRAN ® Nylon (Nylon 6)/G1110 | Easy removal, good pull-tab | V Strong | 104.6 |
| Comparative Sample 3 | 1 Mil A4000 (FEP)/No PSA | V Easy removal, good pull-tab | Medium | 55.3 |
| Test Sample 4 | 1 Mil A4000 (FEP)/G1110 | V Easy removal, good pull-tab | V Strong | 68.1 |
| Test Sample 5 | 1 Mil PMP/HL2201X | OK removal, good pull-tab | Medium | 53.8 |

*Adhesion values are lower than normal due to the use of aged balance pads, rather than new balance pads; separations are at the interface between the innerliner and the gray adhesive, which is a layer in the balance pad.

As shown by the test samples compared to the comparative samples, good adhesion is still obtained between the virgin surface and balance pad regardless of the presence of the PSA. In other words, the PSA is either removed with the thermoformable film leaving little or no adhesive residue behind that might negatively affect subsequent adhesion of the balance pad, or the PSA becomes part of the innerliner or a coating thereon and does not affect adhesion due to its material compatibility with the innerliner material. Thus, the PSA permits the thermoformable film to stay reliably and securely in place during the lining cement spray, shaping and curing steps, and permits subsequent removal of the thermoformable film so as to provide a cured virgin surface free of release agent to which a device may be cohesively bonded.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A method for protecting a virgin surface of a tire innerliner from contamination by a release agent during curing, comprising:
pressing a pressure-sensitive adhesive (PSA)-coated thermoformable film onto an exposed virgin surface of a green tire innerliner to adhere the PSA to the virgin surface and thereby form a protected green innerliner, the PSA is in direct contact with the thermoformable film and the exposed virgin surface, and wherein the PSA comprises, as a principle component, a rubber that is compatible with a rubber component of the tire innerliner;
exposing the protected green innerliner to the release agent;
curing the protected green innerliner, wherein the thermoformable film is easily removable and at least a portion of the PSA becomes a part of the tire innerliner upon curing; and
thereafter removing the thermoformable film to reveal the virgin surface substantially free of the release agent.

2. The method of claim 1 further comprising, before curing:
assembling the protected green innerliner adjacent a first side of a green tire carcass, and assembling a green tire tread adjacent an opposing second side of the green tire carcass to form a green assembly having the thermoformable film at an innermost surface;
exposing the protected green innerliner to the release agent by spraying the release agent under high pressure over the innermost surface of the green assembly; and
placing the green assembly against a mold surface with the green tire tread contacting the mold surface,
wherein the curing comprises expanding a curing bladder against the innermost surface of the green assembly to shape the green assembly to a desired tire form and applying a vulcanization temperature to the desired tire form for a time sufficient to form a cured tire assembly.

3. The method of claim 1 wherein the curing comprises expanding a curing bladder against the protected green innerliner to shape the protected green innerliner to a desired tire innerliner form and applying a vulcanization temperature to the desired tire innerliner form for a time sufficient to form a cured tire innerliner.

4. The method of claim 1 wherein the exposing comprises spraying the release agent under high pressure over the protected green innerliner.

5. The method of claim 1 wherein the principle component of the PSA is natural rubber, a halobutyl rubber, a butyl rubber, or a polybutadiene rubber.

6. The method of claim 1 wherein the thermoformable film exhibits a necking force in both the machine direction and the cross direction of less than about 25 lbf, as measured for a 1 inch width film at room temperature at a cross-head speed of 20 in./min.

7. The method of claim 6 wherein the necking force in both directions is less than about 20 lbf.

8. The method of claim 6 wherein the necking force in the machine direction is essentially equal to the necking force in the cross direction, whereby the film is non-oriented.

9. The method of claim 1 wherein the thermoformable film is a nylon film.

10. The method of claim 1 further comprising, after removing the thermoformable film, permanently adhering at least one of a balance pad or an electronic monitoring device to the virgin surface.

11. The method of claim 1 wherein the PSA-coated thermoformable film is pressed onto the exposed virgin surface to form an overlapping portion usable as a pull-tab for removing the thermoformable film.

12. A method for protecting a virgin surface of a tire innerliner from contamination by a release agent during curing, comprising:

pressing a pressure-sensitive adhesive (PSA)-coated nylon film onto an exposed virgin surface of a green tire innerliner to adhere the PSA to the virgin surface and thereby form a protected green innerliner, the PSA is in direct contact with the nylon film and the exposed virgin surface, and wherein the PSA comprises, as a principle component, a rubber selected from natural rubber, a halobutyl rubber, a butyl rubber, or a polybutadiene rubber;

spraying the release agent under high pressure over the protected green innerliner;

curing the protected green innerliner, wherein the nylon film is easily removable and at least a portion of the PSA becomes a part of the tire innerliner upon curing; and thereafter, removing the nylon film to reveal the virgin surface substantially free of the release agent.

13. The method of claim 12 further comprising, before spraying, assembling the protected green innerliner adjacent a first side of a green tire carcass, and assembling a green tire tread adjacent an opposing second side of the green tire carcass to form a green assembly having the nylon film at an innermost surface; and after spraying, placing the green assembly against a mold surface with the green tire tread contacting the mold surface, wherein the curing comprises expanding a curing bladder against the innermost surface of the green assembly to shape the green assembly to a desired tire form and applying a vulcanization temperature to the desired tire form for a time sufficient to form a cured tire assembly.

14. The method of claim 12 wherein the curing comprises expanding a curing bladder against the protected green innerliner to shape the protected green innerliner to a desired tire innerliner form and applying a vulcanization temperature to the desired tire innerliner form for a time sufficient to form a cured tire innerliner.

15. The method of claim 12 wherein the nylon film exhibits a necking force in both the machine direction and the cross direction of less than about 25 lbf, as measured for a 1 inch width film at room temperature at a cross-head speed of 20 in./min.

16. The method of claim 15 wherein the necking force in both directions is less than about 20 lbf.

17. The method of claim 15 wherein the necking force in the machine direction is essentially equal to the necking force in the cross direction, whereby the film is non-oriented.

18. The method of claim 12 further comprising, after removing the thermoformable film, permanently adhering at least one of a balance pad or an electronic monitoring device to the virgin surface.

19. The method of claim 12 wherein nylon film is pressed onto the exposed virgin surface to form an overlapping portion usable as a pull-tab for removing the nylon film.

* * * * *

UNITED STATES PATENT AND TRADEMARK OFFICE
CERTIFICATE OF CORRECTION

PATENT NO. : 7,419,557 B2 Page 1 of 1
APPLICATION NO. : 11/221461
DATED : September 2, 2008
INVENTOR(S) : Ramendra N. Majumdar et al.

It is certified that error appears in the above-identified patent and that said Letters Patent is hereby corrected as shown below:

In column 2, line 41, after "thus" delete ",".

In column 2, line 58, change "principle" to --principal--.

In column 7, line 35, change "principle" to --principal--.

In column 7, line 50, after "adhere" delete "to".

In column 9, line 55, CLAIM 1, change "principle" to --principal--.

In column 10, line 44, CLAIM 5, change "principle" to --principal--.

In column 11, line 9, CLAIM 12, change "principle" to --principal--.

Signed and Sealed this

Twenty-first Day of December, 2010

David J. Kappos
*Director of the United States Patent and Trademark Office*